United States Patent
Bedingfield (10) Patent No.: US 7,382,872 B2
(45) Date of Patent: Jun. 3, 2008

(54) SYSTEMS AND METHODS FOR PROVIDING ADVANCED TELEPHONY SERVICES

(75) Inventor: James C. Bedingfield, Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1037 days.

(21) Appl. No.: 10/210,830

(22) Filed: Aug. 1, 2002

(65) Prior Publication Data
US 2004/0156492 A1 Aug. 12, 2004

(51) Int. Cl.
*H04M 7/00* (2006.01)
(52) U.S. Cl. ............... 379/221.08; 379/221.09; 379/229; 379/230
(58) Field of Classification Search ........... 379/221.08, 379/221.09, 229, 230
See application file for complete search history.

(56) References Cited

U.S. PATENT DOCUMENTS 6,411,704 B1 6/2002 Pelletier et al. ............ 379/230
2003/0036917 A1* 2/2003 Hite et al.

* cited by examiner

*Primary Examiner*—Quynh H Nguyen
(74) *Attorney, Agent, or Firm*—Scott P. Zimmerman, PLLC (57) ABSTRACT

Systems and methods for providing a plurality of advanced telephony services using a metaservice are described. In an embodiment of the present invention, a service provider installs a metaservice on the processor and associates the metaservice with a directory number on the switch. The metaservice acts as a pseudo service. When the service provider receives a subsequent request for an advanced telephony service, the service associates the requested service with the directory number through the metaservice, thereby avoiding many of the provisioning steps that are conventionally required to set up each service.

20 Claims, 5 Drawing Sheets

SYSTEMS AND METHODS FOR PROVIDING ADVANCED TELEPHONY SERVICES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates generally to telecommunications systems and methods. More specifically, the present invention relates to systems and methods for providing a plurality of advanced telephony services using a metaservice.

BACKGROUND

Local telephone service providers have historically set a high standard for quality and reliability. For example, the traditional measure of reliability has been five nines or 99.999% reliability, which translates to just five minutes and fifteen seconds of downtime per year. The service providers have achieved these high standards by rigorously controlling the methods for development and deployment of new services and features in their legacy telecommunications infrastructures. However, as telecommunications technology evolves, and as the competitive environment changes, these conventional methods have become impediments to the service provider's ability to successfully compete against providers using new and faster, but not necessarily better, methods.

In a legacy system, the service provider must perform a multitude of steps to develop, test, and deploy a single service. These steps include changes to provisioning systems, billing systems, and customer support methods as well as changes to marketing and sales plans. The costs involved in these changes can amount to millions of dollars for each new service. The high cost of a new service deters the service provider from offering a service for which the service provider has difficulty estimating the size of the target market or for which the service provider knows only a small market exists. To remain competitive, service providers have a need to minimize these costs for new services.

One way in which service providers are attempting to minimize the costs of service development and deployment is to begin to transition their legacy systems to newer, faster, and more flexible systems, such as those based on the Internet protocols. These new systems hold great promise for service provisioning, support, and billing. These newer systems provide efficiency and cost benefits to service providers and provide benefits to subscribers as well, including graphical user interfaces that allow the subscriber to control complicated services through simple commands and that provide great flexibility to subscribers with more advanced skills. Furthermore, the majority of conventional programming and network advances focus on Internet service development and support, such as Java and similar languages, encryption and authentication procedures, multimedia compression and congestion access control, and network management.

One challenge facing the service provider is successfully managing the transition. Service providers have begun some measures to integrate the legacy and newer systems, such as adding softswitches and application servers, but one key challenge remains—maintaining quality and reliability while increasing the speed of development and deployment of new services. Service providers have a need for systems and methods that allow the rapid development and deployment of advanced telephony services, including Internet protocol based services, in conventional, legacy telecommunications infrastructures.

BRIEF SUMMARY OF THE INVENTION

Embodiments of the present invention provide systems and methods for providing a plurality of advanced telephony services to a customer using a metaservice. In one embodiment of the present invention, the system for providing advanced telephony services includes a switch and a processor in communication with a telecommunications network. A service provider installs a metaservice on the processor and associates the metaservice with a directory number on the switch. The metaservice acts as a pseudo or placeholder service. Many of the various provisioning steps conventionally necessary for setting up an advanced telephony service for a directory number are performed for the metaservice. Subsequently, the service provider receives a request for an advanced telephony service, and in response, associates the requested service with the directory number through the metaservice. By associating the advanced telephony service with the directory through the metaservice, many of the legacy provisioning steps are avoided for each new service association.

A service provider may implement an embodiment of the present invention in a variety of environments, including an advanced intelligent network (AIN), a packet-switching network, a combination of the two, or some other form of communications network. In one embodiment implemented in an AIN, the switch is a service switching point, and the processor is a service control point (SCP). In another embodiment implemented in a packet-switching network, the switch is a media gateway, and the processor is a media gateway controller or application server. In yet another embodiment, the switch is a softswitch.

Embodiments of the present invention may include additional elements as well. For example, in one embodiment of the present invention, a service request application executing on a web server provides a means for a customer to request new advanced telephony services to be associated with the subscriber's directory number. A service provider may implement other request methods as well. For example, the service provider may implement a method utilizing a dual tone multifrequency (DTMF) system. In such an embodiment, a subscriber submits a request via wireless or wireline telephone.

In one embodiment of the present invention implemented in an AIN environment, associating the metaservice with a directory number includes activating a termination attempt trigger (TAT) on the switch, installing the metaservice on the processor, and associating the metaservice with the trigger.

Embodiments of the present invention implement a variety of services, such as an outbound call manager, an intercom service, a personal dialing plan, a voice dialing service, and an originating call log. An embodiment of the present invention also includes software and hardware necessary for administration and billing the metaservice and associated advanced telephony services.

Embodiments of the present invention provide numerous advantages over conventional systems and methods for providing advanced telephony services. In an embodiment of the present invention, a service provider can deploy new services faster, as a result of the decoupling of new service development from legacy operations system modifications. Also, a service provider is able to provide subscribers with more flexible and technically-advanced marketing and sales channels through the use of web-based systems. The subscriber has access to simplified trial offers and the ability to activate and deactivate services as desired or necessary.

The service provider is also able to reduce the need for new billing system modifications in an embodiment of the present invention. The service provider presents a single bill entry for new services produced by the legacy systems and provides a fully-detailed bill accessed through the service request and information system. An embodiment of the present invention also provides a transition path to migrate subscribers and support personnel from conventional legacy systems and processes to IP-based provisioning, billing, and support. This transition path simplifies the eventual transition to fully IP-based systems.

An embodiment of the present invention is technically superior to conventional applications, and as such, portrays the service provider as technically advanced and innovative in its approach to new service development and deployment. An embodiment of the present invention also allows the service provider to continue to derive benefit from existing legacy systems until newer, more advanced systems are developed and deployed.

Further details and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF THE INVENTION

Embodiments of the present invention provide systems and methods for the provision of advanced telephony services. In an embodiment of the present invention, a service provider associates a metaservice with a directory number. Associating the metaservice with the directory number eliminates a multitude of steps necessary for subsequent additions and modifications to the advanced telephony services provided to a directory number. A service provider or equipment manufacturer may implement an embodiment of the present invention in a variety of communications environments as is described herein.

Figure 1:
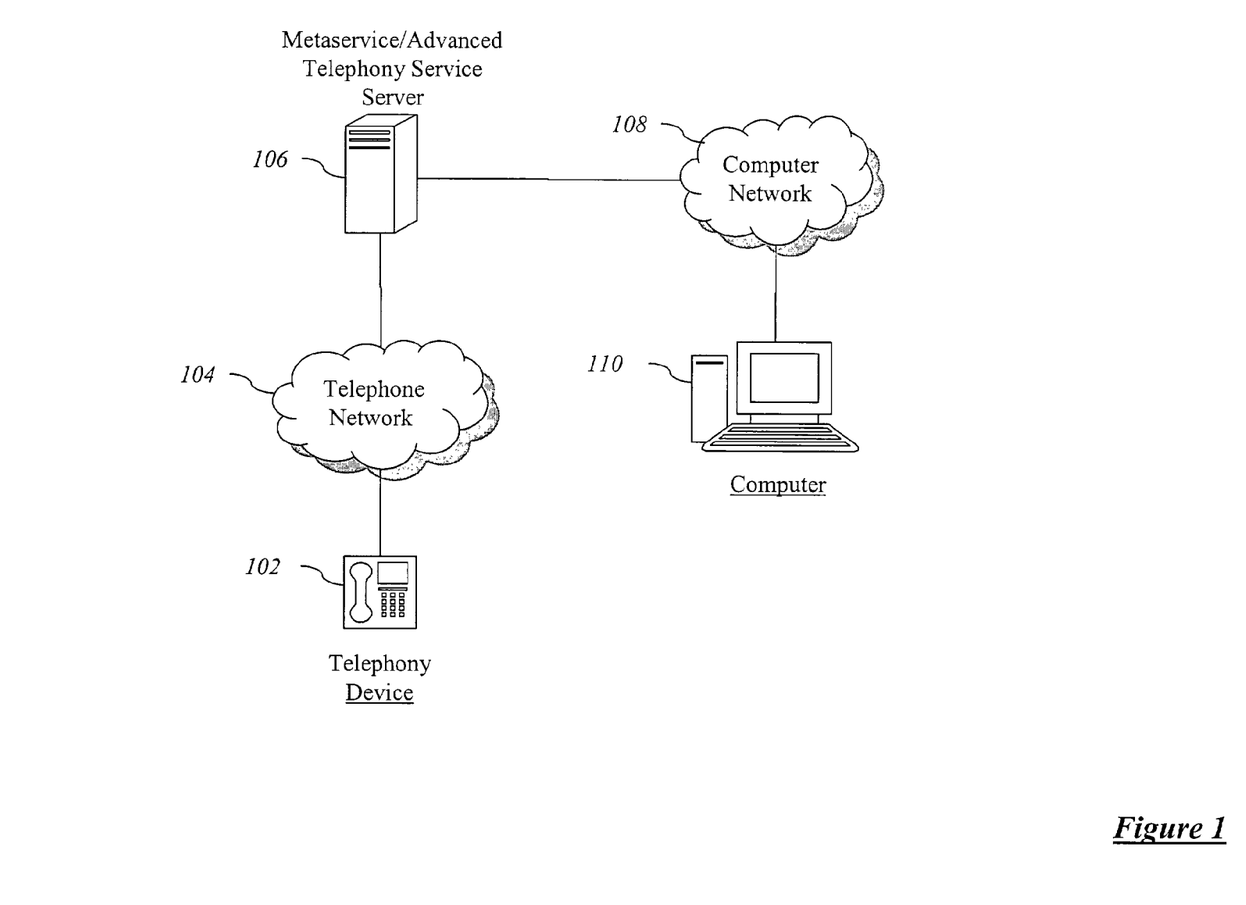
FIG. 1 is a block diagram, illustrating an exemplary environment for implementation of an embodiment of the present invention.

Referring now to the Figures in which like numerals indicate like elements throughout the several Figures, FIG. 1 illustrates an exemplary environment for implementation of an embodiment of the present invention. The embodiment shown includes a telephony device 102, such as a telephone. The telephony device 102 communicates with a telephone network 104. The telephone network 104 may comprise an advanced intelligent network (AIN), such as the AIN described with reference to FIG. 2 below, a packet-switching network, a combination of AIN and packet-switching networks, or any other telecommunications network capable of providing advanced telephony services.

The embodiment shown also includes a metaservice/advanced telephony service server 106. The service provider installs a metaservice on the server 106. The metaservice may simply be an enabling configuration, or it may be a software application that is similar to other software application installed on a telecommunications application server, such as call forwarding applications. To the legacy infrastructure, the metaservice appears to be just as any legacy-compatible telephony service, such as call waiting. However, the metaservice performs a different function than the conventional services; the metaservice serves as a pseudo service or placeholder for advanced telephony services that are later provisioned for a particular subscriber telephone line. Conventionally, a service provider performs several steps to set up any advanced telephony service. These steps include changes to a switch, media gateway, or other network device connected to the telephony device 102. The steps also include changes to the applications installed on the server 106, changes to billing procedures, and changes to customer service procedures. When the provider installs the metaservice on the server, all or most of these steps must be completed.

The metaservice comprises application software, which is capable of executing on the server 106. The service provider installs this software on the server 106. The service provider also associates the metaservice with a trigger or other signaling method within the telecommunications network 104 serving the subscriber. The implementation of the metaservice also changes the billing system so that a metaservice line item appears on the subscriber's bill. In addition, the service provider may change customer service and web site materials and applications to more efficiently and effectively support subscribers who are using advanced telephony services provided via the metaservice. For example, the service provider adds additional web pages to a web server in the computer network 108 that explain the advanced telephone services available via the metaservice. In addition, the service provider creates a web site on the web server that allows the subscriber to add new services to their subscriber line through the metaservice.

When the service provider adds an advanced telephony service for a particular subscriber's dialing line after installation of the metaservice for the dialing line, the number of steps necessary to install the advanced telephony service is substantially reduced and simplified, both from the service provider's perspective and, in many cases, from the subscriber's perspective.

The embodiment shown also includes a computer network 108 in communication with the server 106. The computer network 108 provides access to a computer 110 or other access device, which a subscriber uses to request the provision of an advanced telephony service, obtain answers to technical support questions, contact a customer service representative, and perform other functions related to the advance telephony services.

Figure 2:
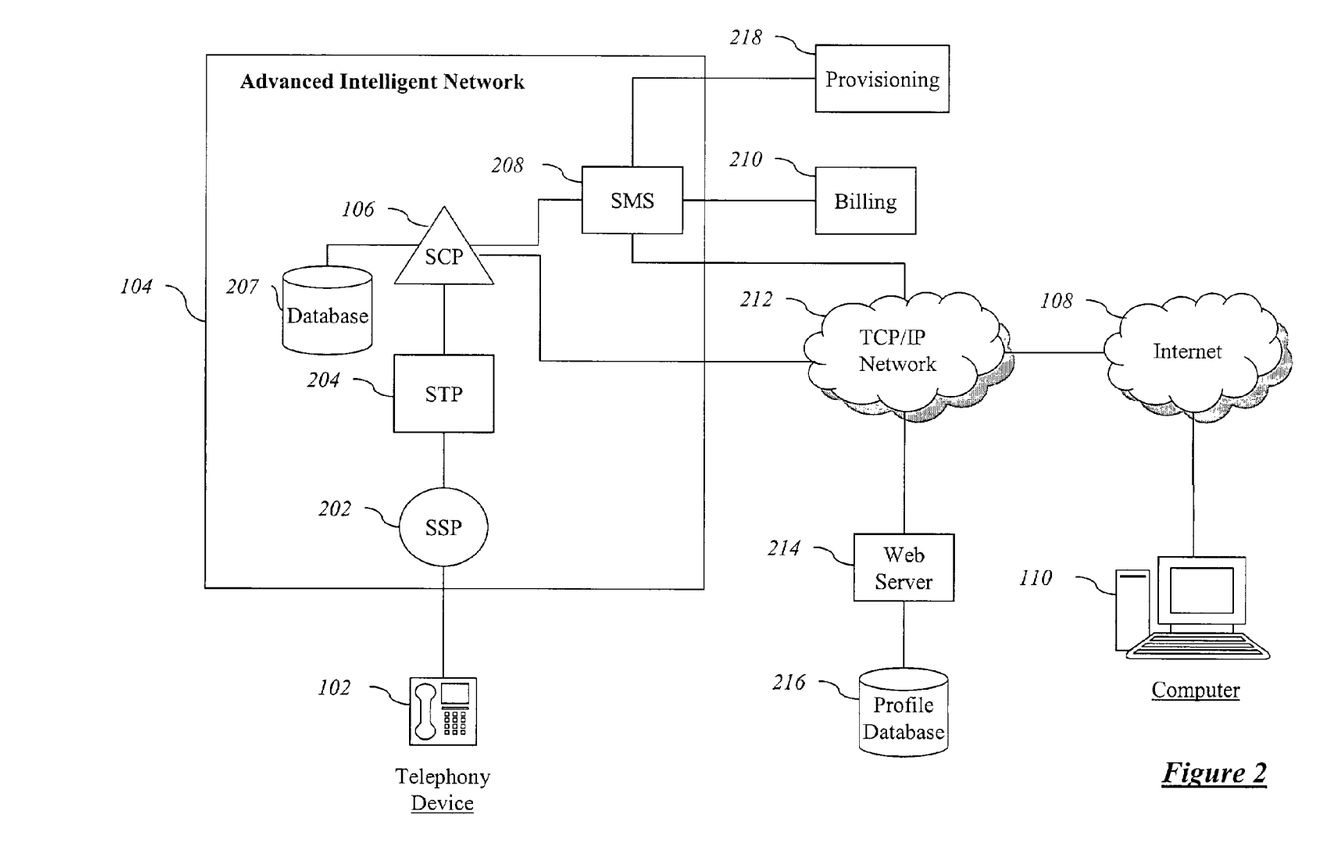
FIG. 2 is a block diagram, illustrating an exemplary advanced intelligent network (AIN) environment for implementation of an embodiment of the present invention.

As described above, a service provider may implement an embodiment of the present invention in a variety of different types of telecommunications networks. FIG. 2 illustrates an embodiment of the present invention in which the telephone network 104 is an AIN. An AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference.

In FIG. 2, the telephony device 102 is in communication with a service switching point (SSP) 202. The SSP 202 is a central office switch that provides intelligent network functionality. When a call is placed or received at the SSP 202, the SSP 202 collects the call information generates a trigger. For example, when a call is directed to a directory number served by the SSP 202, the SSP 202 generates a termination attempt trigger (TAT). A trigger generates a packet that the SSP 202 transmits through a signal transfer point (STP) 204 to a service control point (SCP) 106, causing the SCP 106 to query its database 207 to determine whether to provide conventional telephone service or an advanced service for the call. Signal transfer points, such as STP 204, are packet-switching systems that can route and concentrate messages exchanged between service control points and service switching points.

The SCP 106 in the embodiment shown operates as the metaservice/advanced telephony server 106 shown in FIG. 1. The SCP 106 includes computer processors, application software, and databases that control the setup, routing, processing, and termination of phone calls. The database may be implemented as shared memory (or a shared file or directory) resident on the SCP 106, or as a peripheral device or separate and distinct processor in communication with SCP 106, such as database 207 in FIG. 2.

The embodiment shown also includes a service management system (SMS) 208. The SMS 208 includes processors, memory, and software necessary for administrating the various elements of the AIN 104. The system also includes a billing server 210 in communication with the SMS 208 for collecting information from the SMS 208, a provisioning system 218 for managing new subscriptions, and various other elements for supporting the operation of the network.

The system also includes a number of elements that allow the customer to request a metaservice-enabled advanced telephony service using a simple and efficient user interface. These elements include the computer 110 for displaying the user interface and the computer network 108, which is depicted in FIG. 2 as the Internet, for accessing the provisioning application. The elements also include a TCP/IP network 212, which is in communication with the Internet 108, a web server 214 in communication with the TCP/IP network for generating the user interface and accepting requests and input from the user and system administrator, and a profile database 216 for storing and retrieving information related to available metaservice-enabled services and to specific subscribers. The TCP/IP network includes equipment, such as firewalls and the like, which are necessary to operate a reliable and secure network.

Figure 3:
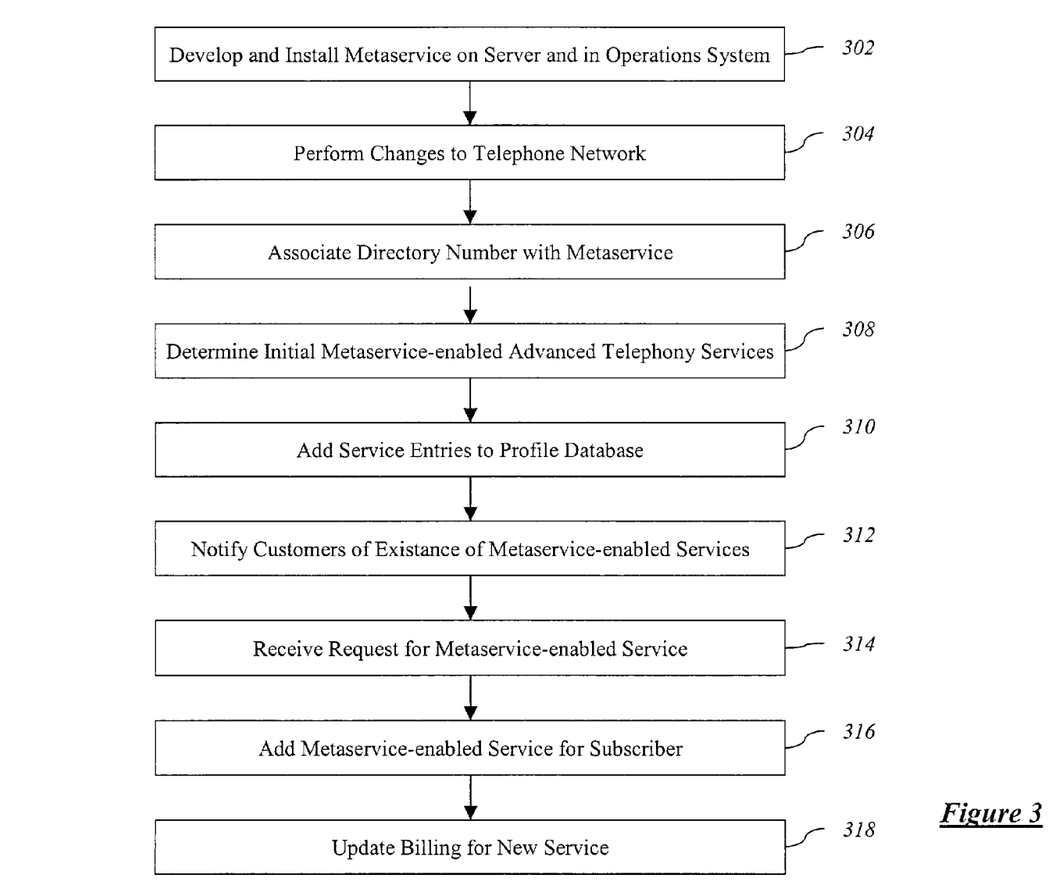
FIG. 3 is a flowchart, illustrating the general, high-level process of setting up the metaservice in an embodiment of the present invention.

The service provider installs the metaservice on the metaservice server 106 before installing advanced telephony services. FIG. 3 is a flowchart, illustrating the general, high-level process of setting up the metaservice in the system shown in FIG. 1. As described above, the metaservice appears to the legacy systems to be a conventional service, such as call forwarding. Therefore, to install the metaservice, a service provider performs the full operations process of deploying a new service, including provisioning and billing system changes. The service provider develops and installs the metaservice on the metaservice server (106) and in the operations systems (208, 210, 218) 302. The metaservice is an application written in software or firmware supported by the metaservice server (106) and designed to perform as a pseudo service for other advanced telephony services. The function of the metaservice might, for example, be to simply determine whether a particular called party has subscribed to any advanced services. If not, the metaservice simply allows the call to proceed. Therefore, the service provider installs the software on the metaservice server and makes changes in the operations systems to allow functional systems, such as billing, to include the metaservice in any continuing and/or periodic processing.

The service provider also modifies the telephone network (104) to technically enable the advanced services to be offered to a particular subscriber on the telephone device (102) 304. The order of the preceding steps in not significant.

The service provider then activates the service for specific subscribers, which entails a variety of steps. The subscribers to be added may be identified in a number of ways. For example, the subscribers may contact the service provider after learning about the service from a marketing campaign. Alternatively, the metaservice installation may be triggered by the addition of another, technically similar service. For example, such a service would include a service associated with the same trigger with which the metaservice is associated. Also, the service provider may identify, activate, and notify subscribers who are potential customers for the metaservice based on other services they use. For example, if a subscriber currently subscribes to advanced Internet services, the subscriber may be likely to have an interest in the metaservice-enabled services.

Referring again to FIG. 3, in order to activate the metaservice for a particular subscriber, the service provider associates the subscriber's directory number or other identifier with the metaservice 306. The service provider must also identify the initial metaservice-enabled telephony services 308. The service provider creates the necessary entries in the profile database (not shown) 310. The service provider then notifies subscribers of the existence of the metaservice-enabled services, notifying subscribers of both existing and future services 312.

For example, if the service provider wishes to provide internet-controlled call forwarding via a metaservice, the service provider creates an entry in the profile database (not shown) for internet-controlled call forwarding. In order to utilize internet-controlled call forwarding, the service must be metaservice-enabled. In other words, it must be able to run under the control of or in communication with the metaservice. The service provider installs the metaservice-enabled service on the server 106 or on another processor in communication with the server 106. The service provider then places an advertisement in a public medium offering the service for sale.

Once the metaservice is activated for a subscriber, the service provider receives requests to add advanced telephony services to the subscriber's dialing line 314. In response, the service provider adds the metaservice-enabled service for the subscriber 316.

After the addition of the new advanced service, the service provider adds a billing entry for the new metaservice-enabled service to the subscriber's periodic bill 318. To facilitate the acceptance of metaservice-enabled services by subscribers, the service provider may initially charge nothing for installing the metaservice, but subsequently charge for each advanced telephony service associated with the metaservice. Alternatively, the service provider may charge the subscriber for when the metaservice is initially installed based on the added flexibility of adding additional advanced telephony services via the metaservice.

In an embodiment of the present invention, such as the one described in relation to FIG. 3, the service provider's customer support function follows a model for customer service conventionally used, for example, by personal computer providers. The model is based on providing simple and efficient access to the most commonly-requested information and on minimizing the number of customer service representatives needed to support any given number of subscribers. In such a model as applied to providing support for a metaservice, the service provider directs the subscriber to a web site with details of the metaservice-enabled services, including user's guides, technical reference information, frequently asked questions, contact information, and the like.

Figure 4:
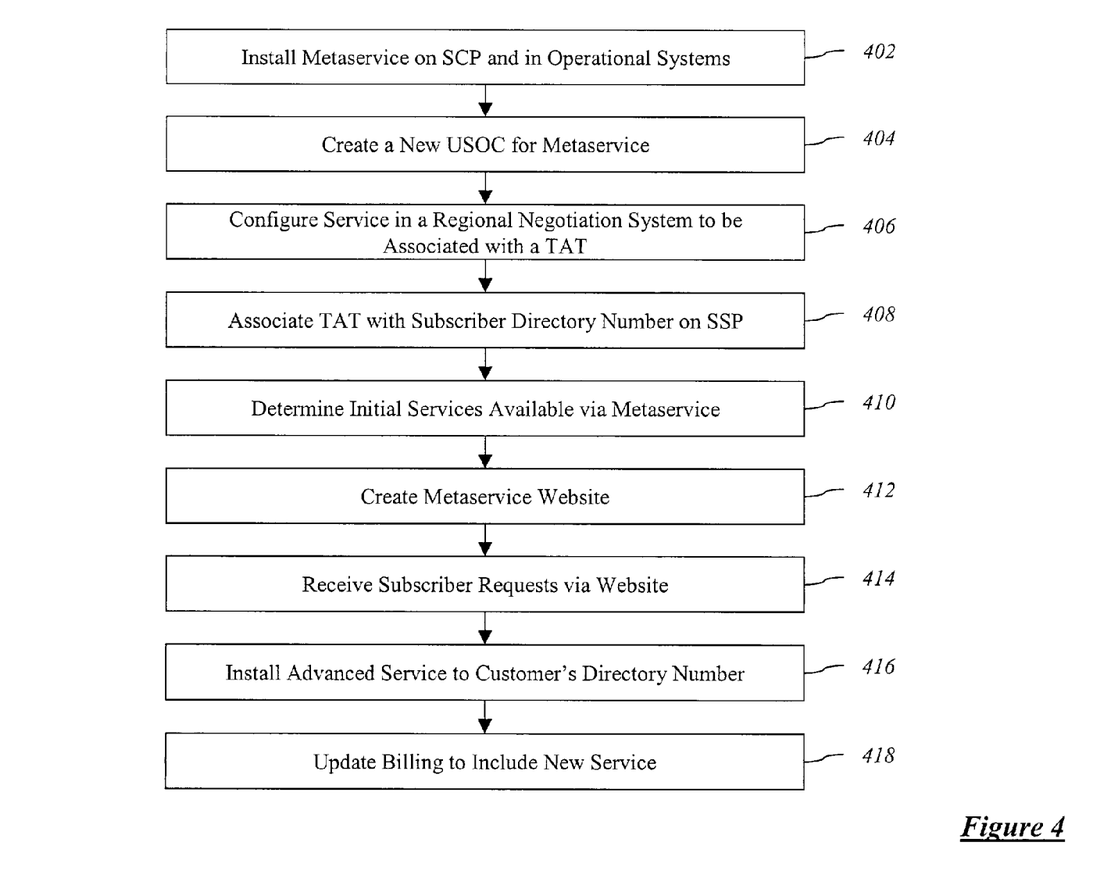
FIG. 4 is a flowchart, illustrating the process of setting up a metaservice and related advanced telephony services in an AIN environment in an embodiment of the present invention.

FIG. 4 is a flowchart, illustrating the process of setting up a metaservice and related advanced telephony services in an embodiment of the present invention in which the telephone network is an AIN, such as AIN 104 shown in FIG. 2. The steps in the process shown in FIG. 4 include legacy operations, website and database operations, and customer-specific operations. The service provider installs the metaservice on the SCP (106) and in the operations systems (208, 210) 402. The service provider creates a new universal service order code (USOC) for the metaservice 404.

The service provider next configures the metaservice in the regional negotiation system (RNS) to be associated with an AIN termination attempt trigger (TAT) 406. The service provider associates the TAT with the subscriber's directory number on the SSP (202) 408. In fact, once the metaservice has been configured in the RNS, any service that causes a TAT to be enabled for a subscriber's directory number on SSP (202) also causes the metaservice to be enabled for their directory number.

The service provider also modifies the billing system (210) to include an entry or entries for the metaservice 410. For example, the service provider may add a new bill entry that is initially zero until metaservice-related services are subsequently added.

In the process shown, the service provider identifies services, which will be available to metaservice subscribers 412. For example, in one embodiment, these services include a call delivery service, web-based call forwarding, and web-based custom messaging. The service provider creates a website which lists the available service and allows subscribers to order the services 414. In one embodiment, the website accesses a database, which contains a list of all subscribers or subscriber directory numbers authorized to subscribe to a metaservice-enabled service.

Subscribers learn about the metaservice via a variety of methods, including direct mail and other marketing campaigns. The service provider invites the subscriber to visit the metaservice website on the web server (214). Once on the site, the customer logs on and views a list of available services. From this list, the subscriber chooses a service and submits it to the service provider. The service provider receives the request to add a service 416. Although in the embodiment described, the customer enters the website to initiate the request, a request may be created in a variety of ways. For example, a service provider may create a promotional campaign in which specific, identified subscribers are targeted for free trials of services in which they may be interested.

When the service provider receives the request for a new service, the service provider installs the new advanced telephony service to the Customer's directory number 418. To install the service, the web server (214) communicates the request to the SCP (106) and SMS (208), including any information necessary to the provision of that service. For example, in a call-forwarding service, the subscriber may enable a cellular telephone number as a selectable target directory number. The communication from the web server may be in the form of a custom message format, or may be in the form of a distributed object model such as Common Object Request Broker Architecture (CORBA) or Distributed Common Object Model (DCOM) requests. The request is transmitted over the TCP/IP network (212).

When services are added, the SMS (208) creates and maintains the necessary billing records for each subscriber activating or using services enabled by the metaservice. The SMS (208) also creates a summary billing record for all of the metaservice-related services. The billing server (210) collects these records in order to create the subscriber's bill. In another embodiment, the SCP (106) itself creates and maintains billing records for each subscriber.

Figure 5:
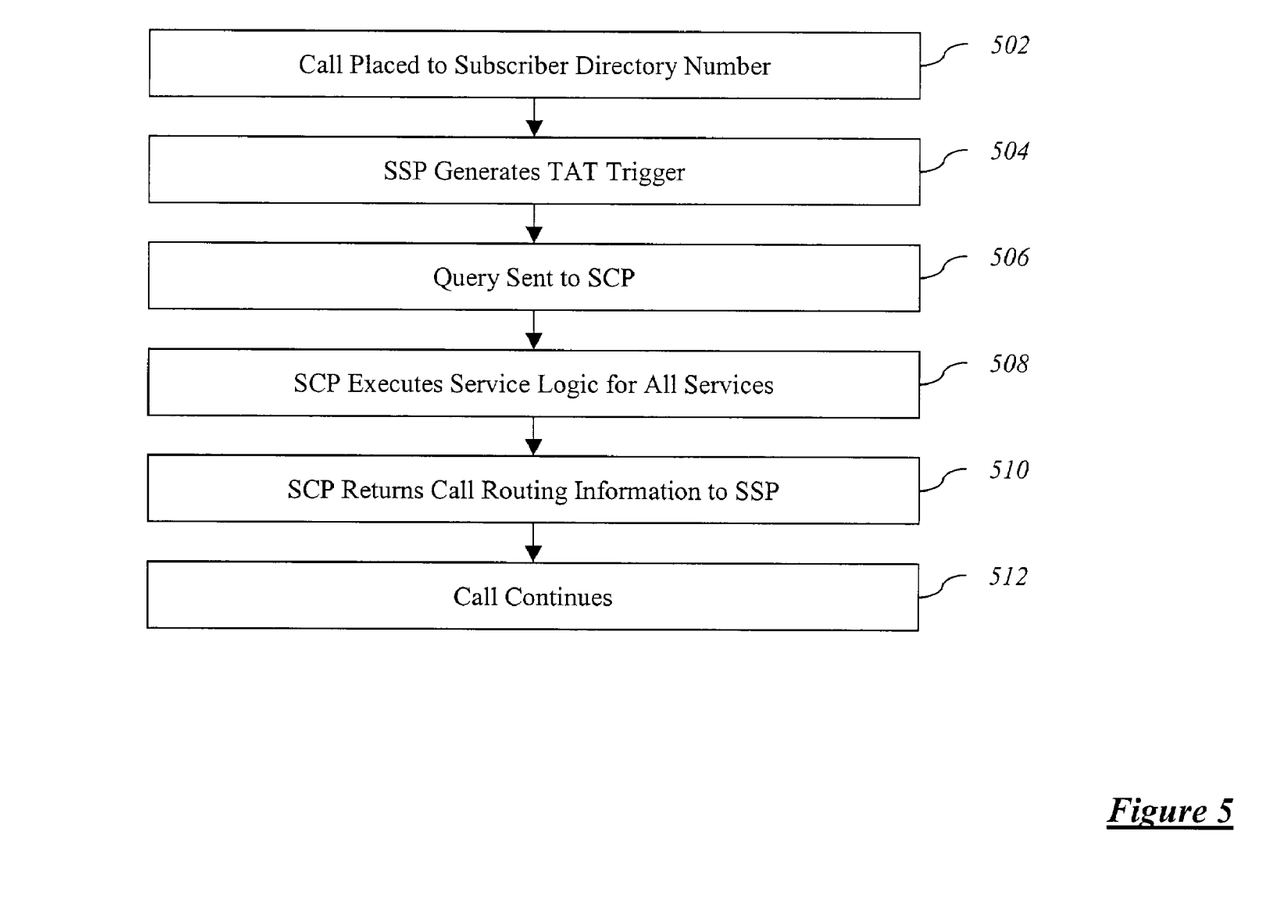
FIG. 5 is a flowchart, illustrating the call flow after installation of the metaservice in an AIN environment in an embodiment of the present invention.

Once the service provider sets up the metaservice described in FIG. 4, each call directed to the subscriber's dialing line results in the TAT being generated. FIG. 5 is a flowchart, illustrating the call flow for a subscriber's line after installation of the metaservice. First, the SSP (202) receives a telephone call directed to the subscriber's directory number 502. In response, the SSP (202) generates a TAT 504. The TAT results in a query being sent to the SCP (106) 506. When the SCP (106) receives the query, the SCP executes the service logic for all services to which the subscriber is currently subscribed 508. For example, in one embodiment, the SCP (106) searches the database (207) and finds that the customer subscribes to web-based call forwarding and web-based custom messaging. The SCP (106) executes the service logic for these two services. The SCP (106) then returns call routing information to the SSP (204) 510. And the telephone call continues 512.

The previous example illustrates only one embodiment of the present invention. Various other embodiments may be implemented. For example, in one embodiment of the present invention, the metaservice is associated with an off-hook delayed (OHD) trigger rather than a TAT. Examples of advanced telephony services, which may be metaservice enabled and associated with an OHD trigger include outbound call manager, intercom service, personal dialing plan, voice dialing, originating call log, and the like.

Because the resources and expense required to install each individual metaservice-enabled service are much lower than with a conventional advanced telephony service, an embodiment of the present invention provides service providers with the opportunity to offer services, which might otherwise not justify the time and expense necessary for development, installation, and provisioning. For the same reasons, the service provider is able to offer metaservice-enabled trial services to subscribers that might be unprofitable under the conventional methods for provisioning advanced services.

Although the present invention has been shown and described with reference to preferred embodiments and examples thereof, other embodiments and examples may achieve the same results and/or perform similar functions. Accordingly, changes in and modifications to the present That which is claimed:

1. A method for providing an advanced telephony service to a customer, comprising:
   associating a metaservice with a directory number;
   provisioning the metaservice as the advanced telephony service, such that the metaservice appears to a legacy infrastructure as a legacy-compatible telephony service, the metaservice thus acting as a pseudo-service for advanced telephony services that are provisioned for the directory number;
   receiving a request for an advanced telephony service for said directory number; and
   providing said advanced telephony service through said metaservice.

2. The method of claim 1, wherein associating said metaservice with said directory number comprises:
   activating a termination attempt trigger (TAT) for a switch associated with said directory number;
   configuring the metaservice in a regional negotiation system;
   before installing the advanced telephony services, installing said metaservice on a processor associated in communication with said switch; and
   associating said metaservice with said TAT.

3. The method of claim 1, further comprising collecting call information and generating the termination attempt trigger.

4. The method of claim 1, further comprising querying a database to determine whether to provide the legacy-compatible telephony service to a call.

5. The method of claim 1, further comprising querying a database to determine whether to provide the advanced telephony service to a call.

6. The method of claim 1, wherein receiving said request comprises receiving said request via a telephony device.

7. The method of claim 1, wherein receiving said request comprises receiving said request via a computer network.

8. The method of claim 1, wherein said advanced telephony service is a service selected from the group consisting of an outbound call manager, an intercom, a personal dialing plan, a voice dialing service, and an originating call log.

9. The method of claim 1, further comprising changing a billing system so that a metaservice line item appears on the customer's bill.

10. A system for providing an advanced telephony service, comprising:
    means for associating a metaservice with a directory number;
    means for provisioning the metaservice as the advanced telephony service, such that the metaservice appears to a legacy infrastructure as a legacy-compatible telephony service, the metaservice thus acting as a pseudo-service for advanced telephony services that are provisioned for the directory number;
    means for receiving a request for an advanced telephony service for said directory number; and
    means for providing said advanced telephony service through said metaservice.

11. The system of claim 10, further comprising:
    means for activating a termination attempt trigger (TAT) for a switch associated with said directory number;
    means for configuring the metaservice in a regional negotiation system;
    before installing the advanced telephony services, means for installing said metaservice on a processor associated in communication with said switch; and
    means for associating said metaservice with said TAT.

12. The system of claim 10, further comprising means for collecting call information and generating the termination attempt trigger.

13. The system of claim 10, further comprising means for querying a database to determine whether to provide the legacy-compatible telephony service to a call.

14. The system of claim 10, further comprising means for querying a database to determine whether to provide the advanced telephony service to a call.

15. The system of claim 10, further comprising means for receiving the request via a telephony device.

16. The system of claim 10, further comprising means for receiving the request via a computer network.

17. The system of claim 10, wherein said advanced telephony service is a service selected from the group consisting of an outbound call manager, an intercom, a personal dialing plan, a voice dialing service, and an originating call log.

18. The system of claim 10, further comprising means for changing a billing system so that a metaservice line item appears on the customer's bill.

19. The system of claim 10, further comprising means for retrieving metaservice-enabled services from a profile database.

20. The system of claim 10, further comprising a billing application means for determining whether a called party subscribes to advanced services and, if the called party is not a subscriber to advanced services, then the metaservice allowing a call to proceed.

* * * * *